(No Model.) 5 Sheets—Sheet 2.
E. B. BULLOCK.
CHAIN MAKING MACHINE.
No. 373,552. Patented Nov. 22, 1887.
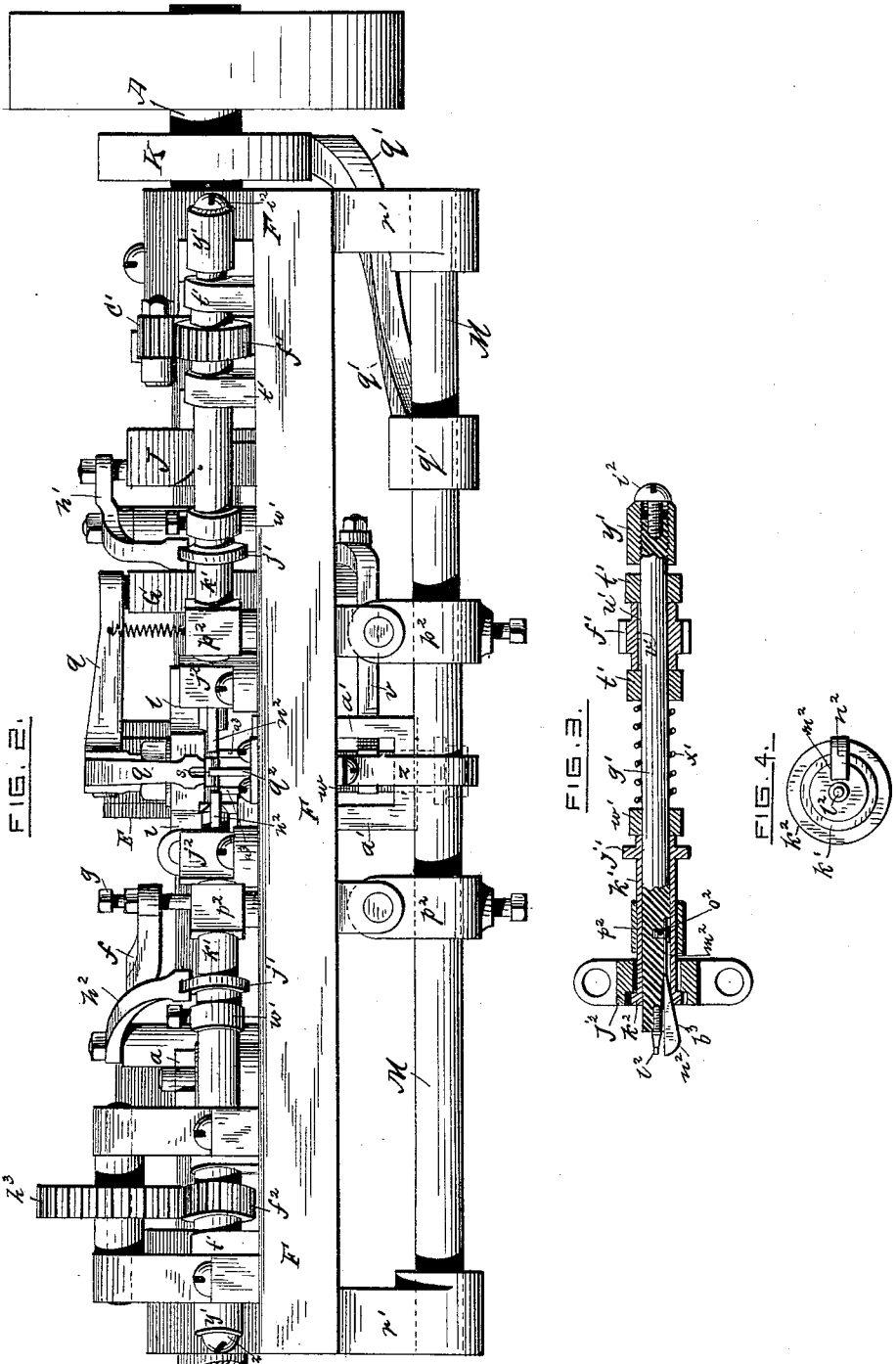
WITNESSES:
Chas. F. Schuch
James Johnson
INVENTOR:
Edwin B. Bullock
by A. Scholfield
Attorney.

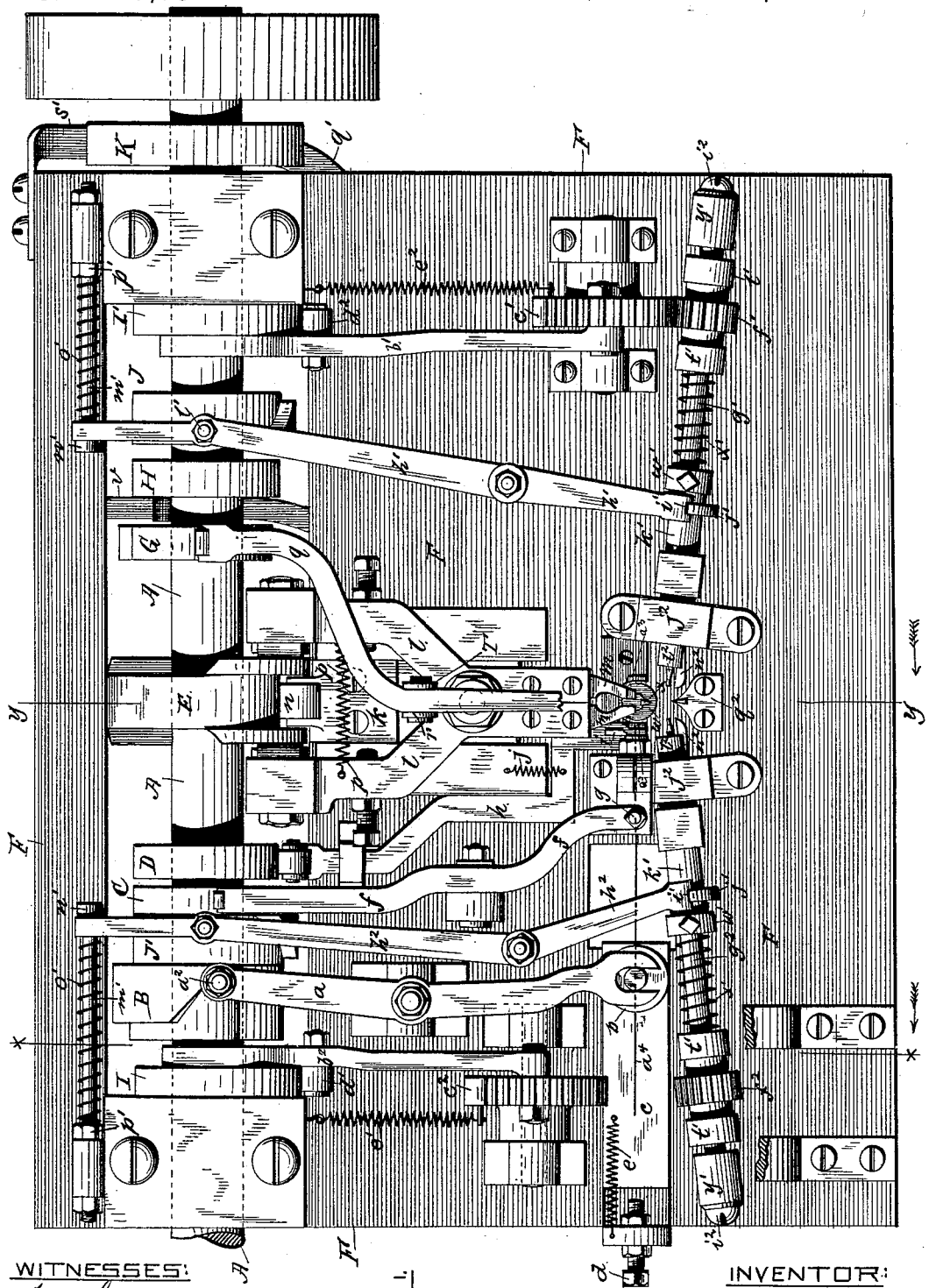

(No Model.) 5 Sheets—Sheet 3.

E. B. BULLOCK.
CHAIN MAKING MACHINE.

No. 373,552. Patented Nov. 22, 1887.

WITNESSES:
Chas. F. Schultz
James Johnson

INVENTOR:
Edwin B. Bullock
by S. Scholfield
Attorney (No Model.) 5 Sheets—Sheet 4.
E. B. BULLOCK.
CHAIN MAKING MACHINE.
No. 373,552. Patented Nov. 22, 1887.
FIG. 8.
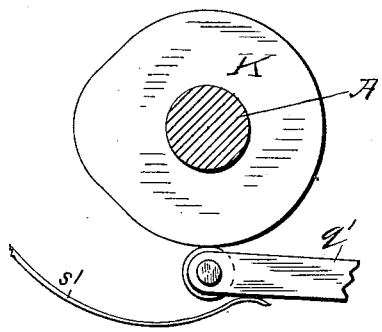
FIG. 9.
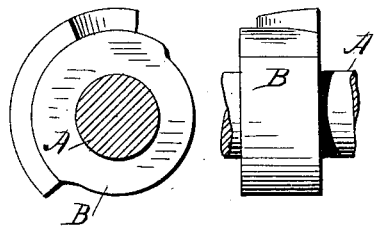
FIG. 10.
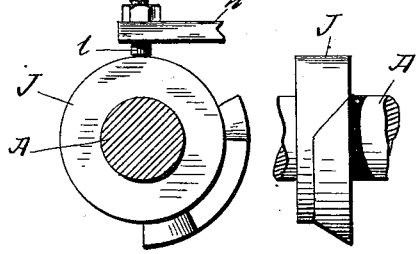
FIG. 11.
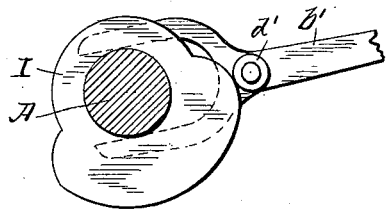
FIG. 12.
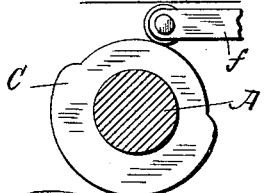
FIG. 13.
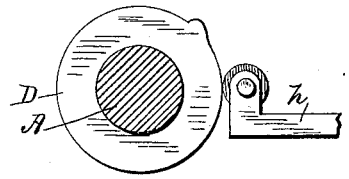
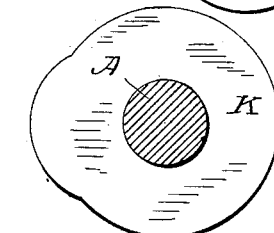
FIG. 14.
WITNESSES:
Chas. F. Schmelz.
James Johnson.
INVENTOR:
Edwin B Bullock
by L. Scholfield
Attorney.

(No Model.) 5 Sheets—Sheet 5.
E. B. BULLOCK.
CHAIN MAKING MACHINE.
No. 373,552. Patented Nov. 22, 1887.
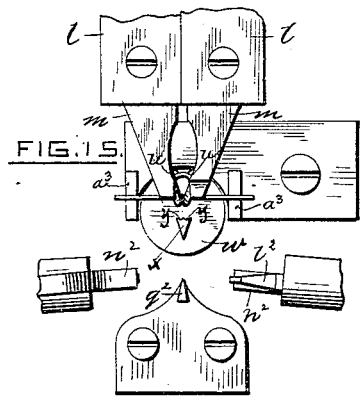
FIG. 15.
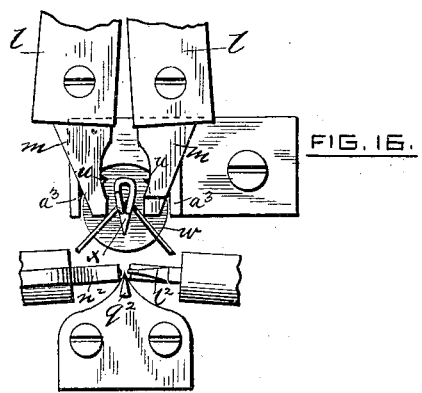
FIG. 16.
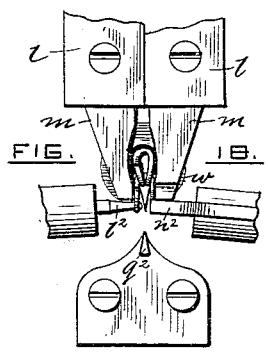
FIG. 18.
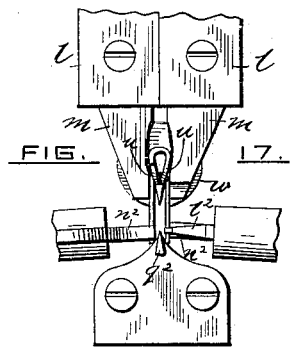
FIG. 17.
FIG. 19.
FIG. 20.
WITNESSES:
Chas. F. Schmelz
James Johnson
INVENTOR:
Edwin B. Bullock
by S. Schofield
Attorney.

United States Patent Office.

EDWIN B. BULLOCK, OF ATTLEBOROUGH, MASSACHUSETTS.

CHAIN-MAKING MACHINE.

SPECIFICATION forming part of Letters Patent No. 373,552, dated November 22, 1887.

Application filed August 17, 1887. Serial No. 247,219. (No model.)

*To all whom it may concern:*

Be it known that I, EDWIN B. BULLOCK, a citizen of the United States, residing at Attleborough, in the county of Bristol and State of Massachusetts, have invented a new and useful Improvement in Chain-Machines, of which the following is a specification.

My invention relates to that class of chain-machines which are adapted to form a continuous chain automatically from a coil of wire; and it consists in an improved combination of devices for forming oppositely-turned eyes at the ends of the wire of the link and for joining the links as they are so formed into a chain, as hereinafter set forth.

Figure 5:
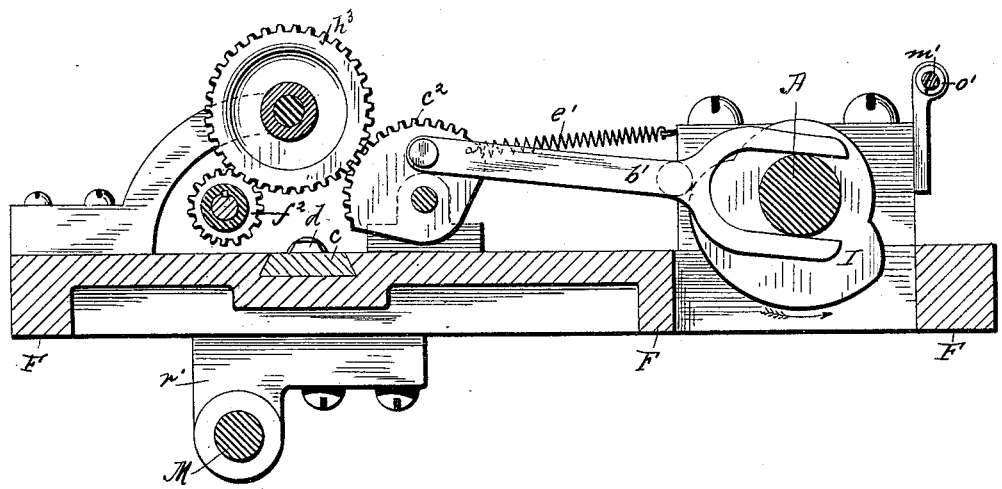
Figure 6:
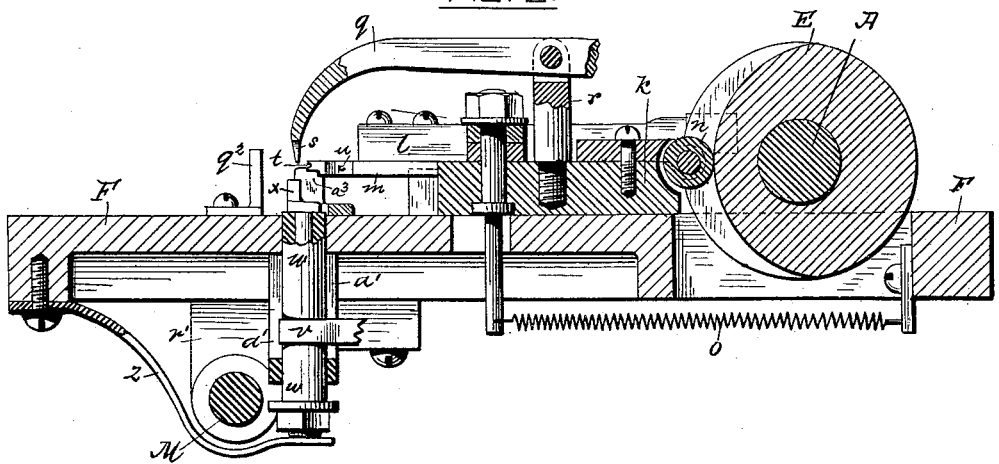
Figure 7:
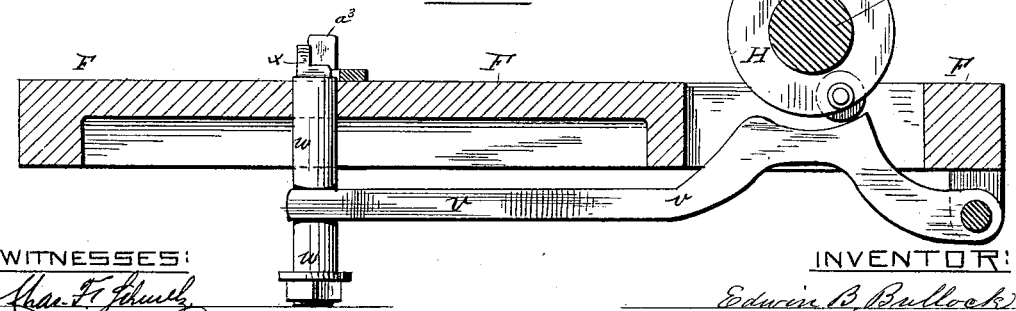

Figure 1 represents a plan view of the machine with the intermediate gear, which serves to operate one of the pliers, removed by breaking the supporting-stands, and also having the link-holding lever broken away. Fig. 2 is a front elevation with the said intermediate gear in position. Fig. 3 is a longitudinal axial section of the shaft of one of the pliers by means of which the turned eyes are formed at the end of the wire of the link. Fig. 4 is an enlarged end view of one of the turning-pliers. Fig. 5 represents a vertical section taken in the line *x x* of Fig. 1. Fig. 6 represents a vertical section taken in the line *y y* of Fig. 1. Fig. 7 is a vertical section showing the lever and roller-cam which serves to operate the spindle of the former. Figs. 8, 9, 10, 11, 12, 13, and 14 are detail views of the several cams. Figs. 15, 16, 17, and 18 are detail plan views showing the forming-jaws and pliers and illustrating the formation of the links. Figs. 19 and 20 are views of different sides of the chain.

In the accompanying drawings, A is the driving-shaft, by means of which motion is imparted to the mechanisms forming the machine. The cam B is secured to the shaft A and arranged to operate the lever $a$, a side elevation and edge view of the cam being shown in Fig. 9. This cam in its rotation first raises the adjacent end of the lever $a$, thus depressing the other end, so as to hold the wire $a^4$ firmly between the disk $b$ and the sliding piece $c$.

To vary the pressure and regulate the distance according to the size of the wire, the adjusting-screw $a^2$ is secured to the lever $a$, with its point resting on the cam. The succeeding movement of the cam serves to feed the wire forward to the cutter, and in order to regulate the length of wire the screw $d$ is arranged to form an adjustable stop, against which the sliding piece $c$ rests, so that any desired length of wire can be fed within the limit of the lateral throw of the cam B. After the proper length of wire to form a link has been separated by the cutter, the lever $a$ is raised from the disk $b$, and thereupon the disk $b$ and sliding piece $c$ will be carried backward to contact with the adjustable stop $d$ by means of the coiled spring $e$.

The cam C, secured to the shaft A, operates the pivoted lever $f$, one end of which is provided with a roller resting on the cam C, the other end of the lever resting on the clamp-pin $g$, so that as soon as the proper length of wire is delivered the cam C forces the lever $f$ on the clamp-pin $g$ and firmly secures the wire.

The cam D imparts reciprocating motion to the sliding bar $h$, at the outer end of which is secured the cutter $i$, the bar $h$ being held against the face of the cam D by means of the coiled spring $j$, so that when the wire is properly fed to the machine the cutter will separate the length projecting to form the link. A separate side view of the cam D is shown in Fig. 13.

The rotation of the cam E with the shaft A forces the sliding head $k$ outward, and to this sliding head are secured the opposing pivoted levers $l\ l$, to the outer ends of which are attached the removable jaws $m\ m$, which are provided at their ends with the groove $t$ and on their inner faces with the spur $u$, adapted to support the rear bend of the link when in the jaws. The sliding head $k$ is provided with a friction-roller, $n$, which is held in contact with the face of the cam E by means of the coiled spring $o$ at the under side of the table F. The levers $l\ l$ are held in contact with the sides of the cam by means of the coiled spring $p$, which is attached to the rearward arms of the said levers.

The cam G, in its rotation with the shaft A, imparts movement to the lever $q$, which is pivoted to a stud, $r$, secured to the sliding head $k$, and is provided at its downwardly-turned forward end with a notch, $s$, which serves to hold the turned eye-loops of the link together against the rear side of the former $x$ when the link is being upset against the same upon the initial forward movement of the jaws $m\ m$, which hold the link.

The roller-cam H, secured to the shaft A, is adapted to operate the pivoted lever $v$, to the outer end of which is connected the vertically-moving spindle $w$. At the upper end of this spindle is located the triangular-shaped former $x$, around which the initial bending of the wire is performed in forming the link, and which is provided with two parallel vertical grooves, $y\ y$, on the side of the same next to the jaws, as shown in Fig. 15, for receiving the ends of the eye-loops of the link and holding the same while the link is being compressed by the continued forward movement of the jaws, and also while the wire to form a new link is being inserted into the loops. The outer end of the lever $v$ is provided with a fork, which is made to loosely embrace the spindle $w$ at a flattened portion thereof, as shown in Fig. 7. The lever $v$ is held against the cam by means of the upwardly-acting flat spring $z$, which is secured to the under side of the table F and rests against the lower end of the spindle. The spindle $w$ is loosely held in a bracket or hanger, $a'$, which is secured to the lower side of the table F, and also passes loosely through a perforation in the table. A side elevation of the roller-cam H, lever $v$, and spindle $w$ is shown in Fig. 7.

The cams I I', secured to the shaft A, are adapted to operate the reciprocating rods $b'\ b^2$, which are pivoted to one side of the segment-gears $c'\ c^2$, the shaft A being held in the forked end of the rod, and the bearing-rollers $d'\ d^2$ of the rods $b\ b'$ are held against the peripheries of the cams I I' by means of the springs $e'\ e^2$. The gear $c'$ is in engagement with the gear $f'$ upon the plier-shaft $g'$, and the gear $c^2$ is operatively connected with the gear $f^2$ on the plier-shaft $g^2$ by means of the intermediate gear, $h^3$. A separate side elevation representing the cams I I' is shown in Fig. 11. The reversely-set cams J J' are also secured to the shaft A, and are adapted to operate the pivoted levers $h'\ h^2$, which are provided at their forward ends with the notch $i'$, the sides of which embrace the annular flange $j'$ of the jaw-operating sleeve $k'$ on the plier-shafts $g'\ g^2$, and the rotation of the cams J J' with the shaft A serves to cause a sliding movement of the sleeve $k'$ upon the plier-shaft. The levers $h'\ h^2$ are also each provided with downwardly-projecting studs $l'$, which serve to engage with the periphery of the cam, and are also extended rearward over the cam to the adjustable guide-studs $m'\ m'$, upon which they are held between the head $n'$ of the stud and the spiral spring $o'$, which is arranged upon the stud between the levers $h'\ h^2$ and the nut $p'$, by means of which the stud is made adjustable, in order to secure a proper limit to the movement of the lever. The studs $l'$ are held against the working-face of the cams J J' by means of the spring $o'$.

Upon the shaft A, beyond the edge of the table F, is placed the cam K, which serves to actuate a lever, $q'$, secured to the rock-shaft M, extending under the table and supported by the hangers $r'\ r'$, the lever $q'$ being held in contact with the cam K by means of the flat-spring $s'$, secured to the edge of the table, a separate side elevation of the cam K and lever $q'$ being shown in Figs. 8 and 14.

The plier-shafts $g'\ g^2$ are held at one end in a bearing-yoke, $t'$, which is pivoted to the table F, so as to allow a horizontal angular movement of the shaft, and the gears $f'\ f^2$ are made to fit between the opposite bearing-arms of the yoke, as shown in the horizontal section, Fig. 3, and are secured to the shaft by means of a groove, $u'$, and pin $v'$, so that the shaft may be moved slightly back and forth in the yoke-bearings and the intermediate gear.

Between the adjustable collar $w'$ and the yoke $t'$ upon the plier-shaft is placed the compressed spiral spring $x'$, and the endwise movement of the shaft in a forward direction, under the action of the spring $x'$, is adjusted and controlled by means of a sleeve-nut, $y'$, upon the rear end of the shaft, and which is firmly held in its set position by means of the check-screw $i^2$. The forward end of the plier-shaft is held loosely for slight angular movement in the slotted bearing-guide $j^2$, which is secured to the table F and embraces the forward end of the sleeve $k'$, which is enlarged to form a flange, $k^2$, which serves as a limiting-stop for the backward movement of the sleeve.

At the axis of the plier-shaft, at its forward end, is placed the removable former or mandrel $l^2$, around which the loops of the link are to be bent, and at one side of the same, and extending backward in a longitudinal groove, $m^2$, made in the exterior of the shaft, is placed the spring-operated jaw $n^2$, which serves to clamp the wire against the forming-mandrel when bending the loop. The spring-jaw $n^2$ may be secured within the groove $m^2$ by means of the screw $o^2$.

Vibrating movement is imparted to the plier-shaft by means of the jointed arm $p^2$, secured to the rock-shaft M, and which at its upper end loosely embraces the sleeve $k'$, the construction of the plier-shaft and the mechanism by means of which the jaw is operated being substantially as heretofore employed in machines for making jack-chains.

Upon the table F, between the ends of the plier-shafts and in line with the reciprocating former, is secured the stationary upright guide $q^2$, made in triangular cross-section, and which serves to gage the proper bending of the wire around the reciprocating former, so that the pliers will surely engage with the folded arms of the wire to form the eye-loops of the link.

Upon the table F, and at opposite sides of the former $x$, are placed the horizontal guides $a^3$, which serve to support the wire to form the link when the same is first severed by the action of the cutter.

The operation of the machine is as follows: A suitable coil of wire is placed near the machine and arranged so that it can unwind automatically. The end of the wire is passed through or between a suitable friction device, as is usual, to retain the wire and straighten the same. It is now passed between the holding-disk $b$ and the sliding piece $c$, and thence to the cutter $i$. The machine may now be started and the desired length of wire to form the link will be fed by the disk $b$, operated through the lever $a$ by means of the cam B. The wire beyond the disk $b$ is then held firmly for the operation of the cutter by means of the clamp-pin $g$, lever $f$, and cam C. The forward movement of the cam D now operates the cutter $i$ through the sliding bar $h$, and by means of the cutter $i$ the required length of wire is cut off to form the link, which wire is then immediately held in proper position between the forward ends of the jaws $m$ $m$ and the vertically-grooved side of the former $x$ and rests upon the horizontal guides $a^3$ $a^3$. The former $x$ now rises with the spindle $w$, through the action of the lever $v$, cam H, and spring $z$, to a position immediately in front of the middle portion of the wire. The notched lever $q$ is now brought down by the action of the cam G to hold the wire upon the horizontal guides and against the forward end of the jaws $m$ $m$, which in a closed condition are then thrown forward by means of the cam E, and when the wire has been brought against the face of the former and slightly bent the jaws $m$ $m$ are suddenly opened and the notched lever $q$ raised from the wire. The jaws $m$ $m$ now move forward, bending the wire still further, and soon have a closing movement, in conjunction with a simultaneous forward movement of the plier-shafts, by means of the levers $h'$ $h^2$ and cams J J', to proper position for bending the eye-loops of the link, the folded arms of the wire being kept from passing beyond the proper line for seizure by the pliers by means of the stationary upright guide $q^2$. The pliers are now caused to seize the opposite arms of the wire thus folded around the former $x$ by means of the forward movement of the sleeves $k'$ through the continued movement of the cams J J' and the action of the springs $x'$, the plier-shafts being at this time held from forward movement with the sleeve by means of the adjustable sleeve-nut $y$. The jaws $n^2$ will thus be closed upon the wire by the action of the sleeve $k'$ upon the inclined cam-surface $b^3$ of the back of the jaw. The plier shafts $g'$ and $g^2$ will now be rotated in opposite directions by means of the cam I, the reciprocating rod $b'$, and gears $c'$ $f'$ for rotating the plier-shaft $g'$, and the cam I', reciprocating rod $b^2$, and the gears $c^2$ $h^3$ $f^2$ for rotating the plier-shaft $g^2$. Upon the complete bending of the eye-loops of the link the pliers are withdrawn from the link by the backward movement of the sleeve $k'$, and the former $x$ is carried downward by the action of the cam H, and thus brought out of the central loop of the link. The forming-jaws are now brought back to their first position, with the newly-formed link held therein, and at the same time the pliers are being rotated backward in opposite directions preparatory for action upon another link, and when the forming-jaws are brought back to their extreme rearward position the plier-jaws will have been brought to a horizontal position, as shown in Fig. 1. The wire to form a new link is now fed forward, as before described, and passes through the vertically-turned eye-loops of the link, and the wire when cut off will be held in position by means of the horizontal guides $a^3$ $a^3$, as shown in Fig. 15, and also by the notched lever $q$, the downward movement of the notched end of the lever serving to draw the turned eye-loops of the link toward each other and to support the same laterally during the initial forward movement of the forming-jaws $m$ $m$, by means of which the link will be upset and the complete closing of the eye-loops effected, the link being at this time held in a suitable recess formed in the face of the jaws and supported for compression against the grooved face of the former $x$ by means of the projecting spur $u$, which is formed at the rear of the link-holding recess of the jaws, and at the time of such closing the eye-loops of the link are each held in one of the longitudinal grooves $y$ $y$ of the former $x$. As soon as the complete closing of the previously-formed link is effected, the jaws are suddenly opened, as before described, to the position shown in Fig. 16. Then the wire will be bent around the former by the continued forward movement of the jaws $m$ $m$, and upon the final closing movement of the same the ends or arms of the folded wire are caused to strike against the sides of the stationary guide $q^2$, as shown in Fig. 17, which prevents them from being thrown beyond the proper line for seizure by the jaws of the turning-pliers. The turning-pliers are now brought forward to seize the wire, as also shown in Fig. 17, and upon seizing the same are turned in opposite directions, so that the turned eye-loops of the link will lie in a vertical plane, while the primary bend of the link is in a horizontal plane, and upon the complete turning of the eye-loops of the link, as shown in Fig. 18, the pliers are withdrawn and the former $x$ depressed. The newly-formed link is then carried back in the jaws to a position for the insertion of the wire for the succeeding link, as before described. The chain thus formed is shown in Figs. 19 and 20, Fig. 19 being a view of one side of the chain, and Fig. 20 a corresponding view taken at right angles to that shown in Fig. 19, the oppositely-turned eye-loops of the links being inclined toward each other within the inclosing-loop $b$ of the adjoining link.

I claim as my invention—

1. In a chain-machine, the combination, with a feeding mechanism and cutter, of the reciprocating forming-jaws, the reciprocating former, and the oppositely-rotated pliers, substantially as described.

2. In a chain-machine, the combination, with a feeding mechanism and cutter, of the reciprocating forming-jaws, the wire-supporting guides, the reciprocating former, and the oppositely-rotated pliers, substantially as described.

3. In a chain-machine, the combination, with a feeding mechanism and cutter, of the reciprocating forming-jaws, the reciprocating former, the stationary guide, and the oppositely-rotated pliers, substantially as described.

4. In a chain-machine, the combination, with a feeding mechanism and cutter, of the reciprocating forming-jaws, the wire-supporting guides, the reciprocating former, the stationary guide, and the oppositely-rotated pliers, substantially as described.

5. In a chain-machine, the combination, with the reciprocating forming-jaws and notched holding-lever, of the reciprocating former and the oppositely-rotated pliers, substantially as described.

6. In a chain-machine, the combination, with the reciprocating forming-jaws and notched holding-lever, of the wire-supporting guides, the reciprocating former, and the oppositely-rotated pliers, substantially as described.

7. In a chain-machine, the combination, with the reciprocating forming-jaws and notched holding-lever, of the reciprocating former, the stationary guide, and the oppositely-rotated pliers, substantially as described.

8. In a chain-machine, the combination, with the reciprocating forming-jaws and notched holding-lever, of the wire-supporting guides, the reciprocating former, the stationary guide, and the oppositely-rotated pliers, substantially as described.

EDWIN B. BULLOCK.

Witnesses:
GEORGE A. ADAMS,
ORVILLE P. RICHARDSON, Jr.